United States Patent
Vizzini et al.

(10) Patent No.: US 12,027,684 B2
(45) Date of Patent: Jul. 2, 2024

(54) TEMPERATURE MANAGEMENT SYSTEM

(71) Applicant: Volvo Car Corporation, Gothenburg (SE)

(72) Inventors: Simone Vizzini, Gothenburg (SE); Leonardo Amato, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/528,336

(22) Filed: Nov. 17, 2021

(65) Prior Publication Data

US 2022/0200076 A1 Jun. 23, 2022

(30) Foreign Application Priority Data

Dec. 17, 2020 (EP) .................................... 20215014

(51) Int. Cl.
*H01M 10/613* (2014.01)
*H01M 10/625* (2014.01)
(Continued)

(52) U.S. Cl.
CPC ......... *H01M 10/613* (2015.04); *H01M 10/63* (2015.04); *H01M 10/647* (2015.04); *H01M 10/6556* (2015.04); *H01M 10/625* (2015.04)

(58) Field of Classification Search
CPC .. H01M 10/613; H01M 10/63; H01M 10/647; H01M 10/6556; H01M 10/625;
(Continued)

(56) References Cited

U.S. PATENT DOCUMENTS

| 5,894,836 A * | 4/1999 | Wu ......................... F24S 10/80 |
| | | 126/631 |
| 2003/0037557 A1* | 2/2003 | Ito ........................ B60H 1/3201 |
| | | 62/480 |

(Continued)

FOREIGN PATENT DOCUMENTS

CN 206364151 U * 7/2017
CN 206364151 U 7/2017
(Continued)

OTHER PUBLICATIONS

CN 206364151U Machine Translation (Year: 2017).*
May 11, 2021 International Search Report issued in International Application No. 20215014.0.

*Primary Examiner* — Len Tran
*Assistant Examiner* — Gustavo A Hincapie Serna
(74) *Attorney, Agent, or Firm* — Clements Bernard Walker; Christopher L. Bernard

(57) ABSTRACT

A temperature management system for an energy storage system, a motor vehicle including such a temperature management system, a use of a hygroscopic material in such a temperature management system and a manufacturing method of such a temperature management system. The temperature management system includes at least one energy storage module, a carrier element and a cooling element. The cooling element includes a first surface directed to an environment of the energy storage module and a second surface opposite to the first surface. The carrier element is arranged between the second surface of the cooling element and the energy storage module and configured to transfer heat from the energy storage module in direction to the environment. The cooling element includes at least one humidity absorbent material to increase a heat capacity of the cooling element.

17 Claims, 3 Drawing Sheets

(51) Int. Cl.
*H01M 10/63* (2014.01)
*H01M 10/647* (2014.01)
*H01M 10/6556* (2014.01)

(58) Field of Classification Search
CPC ......... H01M 2220/20; H01M 10/6554; H01M 10/659; H01M 50/233; H01M 20/204; H01M 10/653; H01M 10/6569; Y02E 30/10
USPC ....................................................... 165/200
See application file for complete search history.

(56) References Cited

U.S. PATENT DOCUMENTS

| | | | | |
|---|---|---|---|---|
| 2006/0175906 A1* | 8/2006 | Hino | | G09B 23/18 310/1 |
| 2010/0081254 A1* | 4/2010 | Shimomura | | H01L 21/76254 438/503 |
| 2010/0089558 A1* | 4/2010 | Takada | | F24F 12/006 165/185 |
| 2010/0297479 A1* | 11/2010 | Tsuchida | | H01M 6/18 429/49 |
| 2013/0263530 A1* | 10/2013 | Shiao | | E04D 13/1612 52/95 |
| 2013/0288098 A1* | 10/2013 | Hamlett | | H01M 10/6571 429/120 |
| 2014/0130426 A1* | 5/2014 | Hartman | | E04C 2/525 52/302.1 |
| 2016/0020496 A1* | 1/2016 | Burrows | | B60L 1/02 429/62 |
| 2016/0043370 A1* | 2/2016 | Hatta | | H01M 50/451 180/65.23 |
| 2016/0064708 A1* | 3/2016 | Miller | | H01M 50/24 429/99 |
| 2016/0093847 A1* | 3/2016 | Gunther | | B60L 50/64 429/154 |
| 2018/0019508 A1* | 1/2018 | Lee | | H01M 10/625 |
| 2018/0090800 A1* | 3/2018 | Lim | | H01M 10/6555 |
| 2018/0209637 A1* | 7/2018 | Aikawa | | F24S 30/00 |
| 2018/0219265 A1* | 8/2018 | Osio | | H01M 50/211 |
| 2018/0269441 A1* | 9/2018 | Yum | | H01M 50/209 |
| 2019/0280265 A1* | 9/2019 | Jansen | | H01M 50/293 |
| 2020/0381679 A1* | 12/2020 | Hiraki | | H01M 50/129 |
| 2021/0288366 A1* | 9/2021 | Brenner | | H01M 50/367 |
| 2022/0002606 A1* | 1/2022 | Ganapatibhotla | | H01M 10/6551 |
| 2022/0181714 A1* | 6/2022 | Boddakayala | | H01M 10/625 |
| 2022/0190406 A1* | 6/2022 | Oono | | H01M 50/50 |
| 2022/0247014 A1* | 8/2022 | Harris | | H01M 10/6554 |
| 2022/0328906 A1* | 10/2022 | Cho | | H01M 10/613 |
| 2023/0023147 A1* | 1/2023 | Jin | | H01M 10/6551 |
| 2023/0220219 A1* | 7/2023 | Ma | | H01M 10/613 429/120 |
| 2023/0335830 A1* | 10/2023 | Keum | | H01M 10/6568 |

FOREIGN PATENT DOCUMENTS

| | | | | |
|---|---|---|---|---|
| CN | 210723280 U | | 6/2020 | |
| EP | 3297090 A1 * | | 3/2018 | .......... H01M 10/613 |
| EP | 3297090 A1 | | 3/2018 | |

* cited by examiner

TEMPERATURE MANAGEMENT SYSTEM

CROSS-REFERENCE TO RELATED APPLICATION

The present disclosure claims the benefit of priority of co-pending European Patent Application No. 20 215 014.0, filed on Dec. 17, 2020, and entitled "TEMPERATURE MANAGEMENT SYSTEM," the contents of which are incorporated in full by reference herein.

TECHNICAL FIELD

The present disclosure relates to a temperature management system for an energy storage system, a motor vehicle including such a temperature management system, a use of a humidity absorbent material in such a temperature management system and a manufacturing method of such a temperature management system.

BACKGROUND

Motor vehicles, in particular electric motor vehicles and hybrid vehicles, are provided with a battery system. Sufficient lifespan and power of the battery system are immanent for driving range and value of the electric motor vehicles or hybrid vehicles. The battery system is, however, sensitive to temperature changes and operates best in small ranges of temperatures. The temperature changes and temperature extrema that occur to the battery system decrease the lifespan and power of the battery system. Accordingly, it is important to operate the battery system in controlled temperature environments to avoid a performance degradation of the battery system.

Among various cooling systems for the battery system, a passive cooling means provides the best cost-effectiveness, since it requires very low or no energy consumption for a thermal control such as a heat reduction or dissipation in the battery system.

SUMMARY

There still may be a need to provide an improved temperature management system for an energy system, which provides a better passive cooling means.

The problem is solved by the subject matters of the independent claims of the present disclosure, wherein further embodiments are incorporated in the dependent claims. It should be noted that the aspects of the disclosure described in the following apply to the temperature management system for an energy storage system, a motor vehicle including such a temperature management system, a use of a humidity absorbent material in such a temperature management system and a manufacturing method of such a temperature management system.

According to the present disclosure, a temperature management system for an energy storage system is presented. The temperature management system includes at least one energy storage module, a carrier element and a cooling element. The cooling element includes a first surface directed to an environment of the energy storage module and a second surface opposite to the first surface. The carrier element is arranged between the second surface of the cooling element and the energy storage module and configured to transfer heat from the energy storage module in direction to the cooling element and thereby to the environment. The cooling element includes at least one humidity absorbent material to increase a heat capacity of the cooling element.

The temperature management system according to the present disclosure allows a controlled heat management in the energy storage system without any cooling device, which requires an additional energy supply to operate. The temperature management system may maintain the energy storage system in a temperature range, which is optimal for an operation of the energy storage system. As a result, the temperature management system may increase a performance and/or a lifespan of the energy storage system. Further, a weight and/or volume of the energy system can be reduced.

The energy storage system may be a system configured for storing and providing energy. The energy storage system may include at least one energy storage module or several energy storage modules. The energy storage module may include more than one battery cell or a rechargeable battery cell.

The cooling element may be formed as a block or a layer. The cooling element may face on one side the ambient air or environment of the energy system and on the other side the energy storage module. Accordingly, the cooling element may be configured to transfer heat between the energy storage module and the environment. In other words, the cooling element may be configured to absorb heat from the energy storage module and discharge the heat to the environment. Additionally or alternatively, the cooling element may also isolate the energy storage module from an extreme ambient condition such as an ambient temperature below minus 10 degree Celsius or above 40 degree Celsius.

The cooling element may include at least one material, which may absorb humidity or water vapor. The water vapor contained in the cooling element may increase a heat capacity of the cooling element. The heat capacity indicates an amount of heat to be supplied to a material to cause a temperature change of the material. Water has a high heat capacity of ca. 4.2 J/g° C. This means water may require a lot of heat, before water itself gets hot. In other words, the humidity absorbent material containing water molecules may absorb a large amount of heat produced by the energy storage module without getting warmer or hot. Hence, the cooling element containing water vapor may act as a heat regulator or heat sink and ensure maintaining the temperature of the energy storage system in a pre-defined range of an operating temperature.

Between the energy storage module and the cooling element, the carrier element may be arranged. The carrier element can be understood as an element configured to receive at least one energy storage module to support or hold it. Accordingly, the carrier element may be arranged at a bottom side of the energy storage module. It can be, for example, a battery tray. As an intermediate element, the carrier element may be configured to transfer heat rapidly between the energy storage module and the cooling element.

In an embodiment, the humidity absorbent material is configured to absorb water vapor from the environment. The cooling element may absorb water molecules from the surrounding ambient air of the energy storage system or the atmosphere. Accordingly, the cooling element may be configured not only to absorb heat from the energy storage module, but also to protect it against humidity, which would cause a defect in the energy storage system.

The cooling element may absorb water vapor at night when the humidity in the air is generally higher than in daytime. However, the humidity absorbent material may also absorb the water vapor during daytime, if the environment surrounding the cooling element has an enough humidity and the humidity absorbent material has a free capacity to absorb the water vapor.

In an embodiment, the carrier element includes a metal material. Generally, the metal material has a high thermal conductivity. Accordingly, the carrier element may distribute and transfer heat from the energy storage module rapidly to the cooling element. In an embodiment, the metal material of the carrier element includes aluminum or steel. Among several metal materials, aluminum and steel may be applied as a tray or casing due to their stability and resistance. Accordingly, the carrier element including aluminum or steel may firmly carry the energy storage module and transfer heat from the energy storage module efficiently to the cooling element.

In an embodiment, the temperature management system further includes a thermal interface arranged between the energy storage module and the carrier element. The thermal interface may be arranged at an individual energy storage cell. In other words, the thermal interface may directly contact each of the energy storage cells. The thermal interface may be a heat sink interface and formed as a layer. The thermal interface may have a high thermal conductivity to support a rapid heat removal from the energy storage module to the carrier element.

In an embodiment, the humidity absorbent material includes a hygroscopic material. The hygroscopic material may be understood as a material with a hygroscopic property, which attracts water from its surroundings. The cooling element may include one of silica gel, calcium oxide (CaO), molecular sieve, clay, calcium sulfate ($CaSO_4$) or a combination thereof.

In an embodiment, the humidity absorbent material includes a silica gel. The silica gel has a strong affinity for water molecules. It is thus widely used as a desiccant. The silica gel is an amorphous and porous form of silicon dioxide with a large internal surface. The internal surface may include pores and voids, which may absorb water vapor from the environment. The silica gel may be applied for a long time due to its stability. Hence, the silica gel may be suitable for application as the humidity absorbent material in the cooling element.

The silica gel may also allow a weight reduction of the energy storage system. To achieve a heat capacity of 230 J/° C. of the temperature management system, a conventional system including only an aluminum tray with an area of 46×200 mm, for example, may require 248 g of aluminum. This corresponds to a 10 mm thick aluminum layer for a typical energy storage module. Aluminum has a specific heat capacity of 0.9 J/g° C.

In contrast, the temperature management system including a silica gel in the cooling element according to the present disclosure may require 75 g of aluminum and 52 g of silica gel for the same size of the tray, wherein 26 g water is absorbed in the silica gel. This means an absorption ratio of the water molecules in the silica gel of 50%. Amounts of the aluminum and the silica gel stated above may correspond to a 3 mm thick aluminum layer as the carrier element and a 7 mm thick silica gel layer as the cooling element for an area of 46×200 of the tray. Accordingly, the aluminum may include a heat capacity of 67 J/° C., the silica gel may include a heat capacity of 51.5 J/° C. and water may include a heat capacity of 111 J/° C., a sum of which would be 229 J/° C. As a result, 39% weight reduction may be achieved.

Accordingly, by using silica gel in the cooling element, the overall volume and weight of the temperature management system may be reduced, even though the same heat absorption capacity may be achieved. Further, due to the reduction of the amount of the aluminum, also manufacturing costs of the temperature management system may be reduced.

In an embodiment, the carrier element and the cooling element is arranged in a sandwich structure. The carrier element, the cooling element and/or the thermal interface may be formed as a layer or a housing surrounding the energy storage module. The thermal interface, the carrier element and the cooling element may be arranged in this order from the energy storage module in direction to the environment layer by layer. This may result in a sandwich structure. Accordingly, the temperature management system, hence the energy storage system, may be manufactured compactly with a reduced weight allowing an efficient heat transfer.

In an embodiment, the cooling element is a passive cooling element. In other words, the temperature management system may neither require nor include any additional cooling system, such as a fan or a coolant circulation system, which requires an additional energy supply. The cooling element including the humidity absorbent material may absorb water vapor from the environment and heat from the energy storage module. Since water has a high heat capacity, the heat energy may be transferred and/or attracted to water molecules without increasing the temperature of the cooling element. Hence, the temperature management system may have no energy consumption and a good energy efficiency.

According to the present disclosure, also a motor vehicle is presented. The motor vehicle may be a battery electric vehicle or a hybrid electric vehicle. The motor vehicle includes the temperature management system as described above. The temperature management system is configured to control a temperature of an energy storage system of motor vehicle. Hence, the temperature management system may provide an optimal condition of the energy storage system to operate the motor vehicle. In particular, a capacity and/or a lifespan of the energy storage system may be increased and the weight and/or volume of the energy system may be reduced.

According to the present disclosure, also a use of a humidity absorbent material as a cooling element in the temperature management system is presented. The humidity absorbent material, in other words a desiccant, has a hygroscopic property and it is generally used to keep an object dry. However, the humidity absorbent material according to the present disclosure may be applied to absorb heat produced in the energy storage module by means of water molecules contained in the humidity absorbent material. Accordingly, the temperature management system may maintain a temperature in a predefined range without any further cooling system. In other words, the humidity absorbent material allows a passive cooling means. Hence, an efficient temperature management may be achieved.

According to the present disclosure, also a manufacturing method of a temperature management system for an energy storage system is presented. The manufacturing method includes the steps of providing at least one energy storage module, providing and directing a first surface of a cooling element to an environment of the energy storage module and a second surface opposite to the first surface, and arranging a carrier element between the second surface of the cooling element and the energy storage module. The carrier element is configured to transfer heat from the energy storage module in direction to the environment. The cooling element includes at least one humidity absorbent material to increase a heat capacity of the cooling element.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
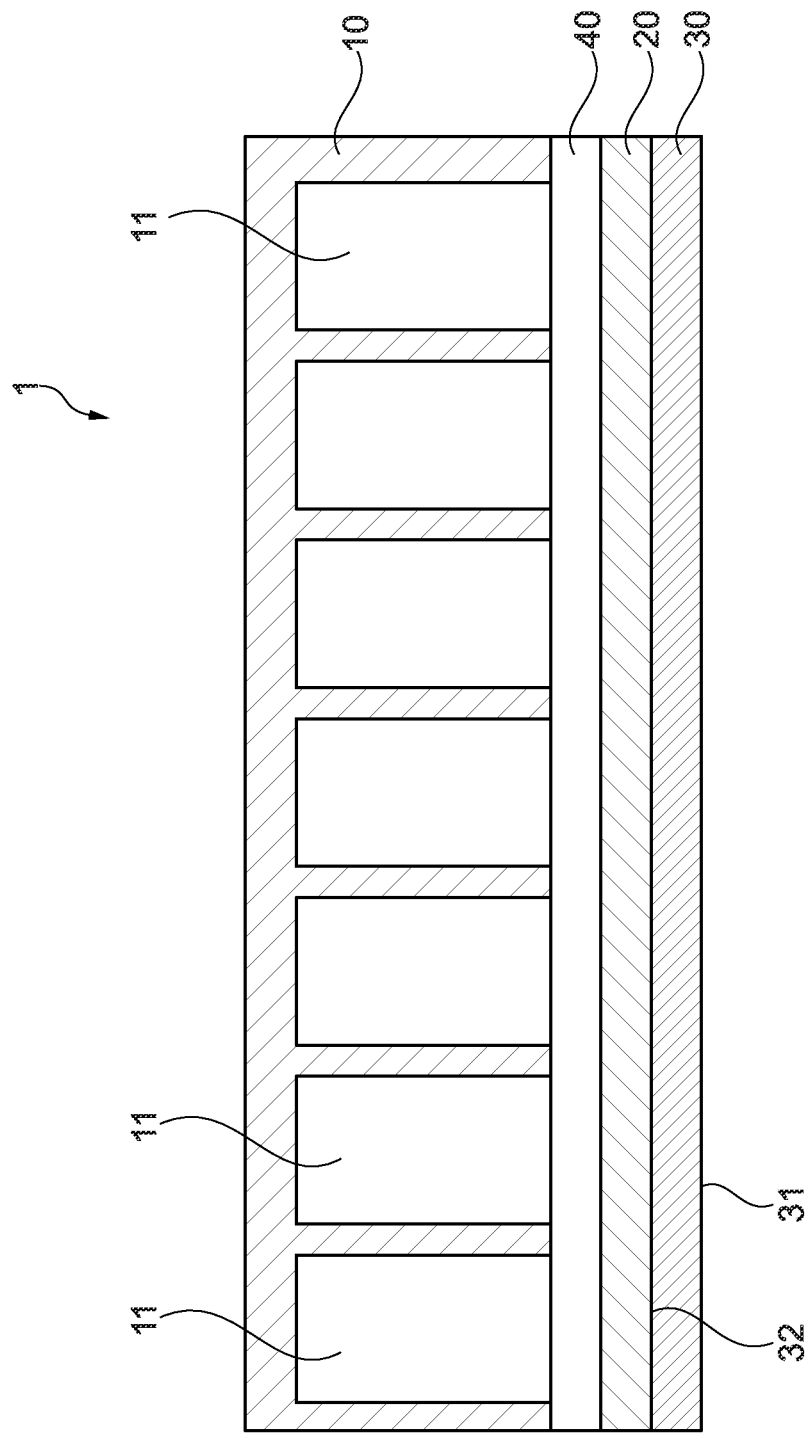
FIG. 1 shows schematically and exemplarily an embodiment of a temperature management system for an energy storage system according to the disclosure.

FIG. 1 shows a temperature management system 1 for an energy storage system. The temperature management system 1 may be configured to control a temperature of an energy storage system for a motor vehicle, such as a battery electric vehicle or a hybrid electric vehicle. The temperature management system 1 according to the present disclosure allows a passive cooling of the energy storage system, in which no active cooling device is required.

The temperature management system 1 includes at least one energy storage module 10, a carrier element 20 and a cooling element 30. The energy storage module 10 may include more than one battery cell 11. The cooling element 30 includes a first surface 31 directed to an environment of the energy storage module 10 and a second surface 32 opposite to the first surface 31. The carrier element 20 is arranged between the second surface 32 of the cooling element 30 and the energy storage module 10. Additionally the temperature management system 1 includes a thermal interface 40 between the energy storage module 10 and the carrier element 20. The thermal interface 40, carrier element 20 and the cooling element 30 are formed as a layer, hence, they are arranged in a sandwich structure.

The carrier element 20 is configured to receive the energy storage module 10 to support or hold it. In other words, the carrier element 20 serves as a tray. The carrier element 20 is further configured to transfer heat from the energy storage module 10 in direction to the cooling element 30 and thereby to the environment. To remove heat efficiently from the energy storage module 10 to the cooling element 30, the carrier element 20 includes a metal material such as aluminum or steel.

Figure 2:
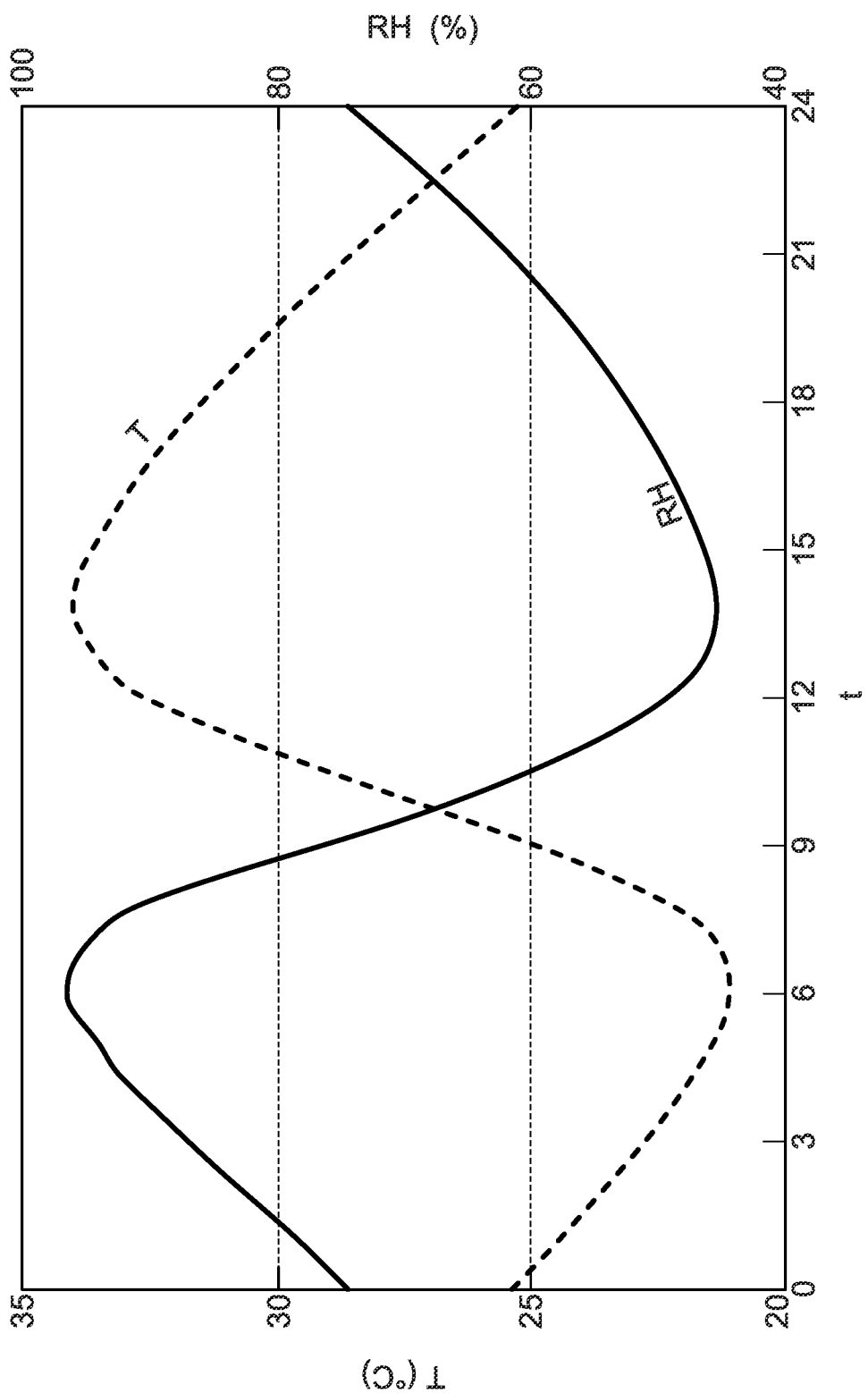
FIG. 2 shows schematically and exemplarily a diagram of a daily cycle of temperature and humidity.

The cooling element 30 includes at least one humidity absorbent material to increase a heat capacity of the cooling element 30. The humidity absorbent material has a hygroscopic property and absorbs water vapor from the environment. The humidity in the air increases generally at night and decreases during daytime as shown in FIG. 2. Hence, the cooling element 30 may absorb water vapor substantially at night. In FIG. 2 the x-axis shows time t of a day and the y-axis shows a temperature range T (° C.) and a relative humidity range RH (%) respectively.

Water has a high heat capacity, ca. 4.2 J/g° C. This means water absorbs a lot of heat, before water itself begins to be hot. In other words, the humidity absorbent material containing water molecules may absorb a large amount of heat produced by the energy storage module 10 without getting warm or hot. Hence, water may act as a heat regulator and ensure maintaining the temperature of the energy storage system in a pre-defined range of an operating temperature.

Figure 3:
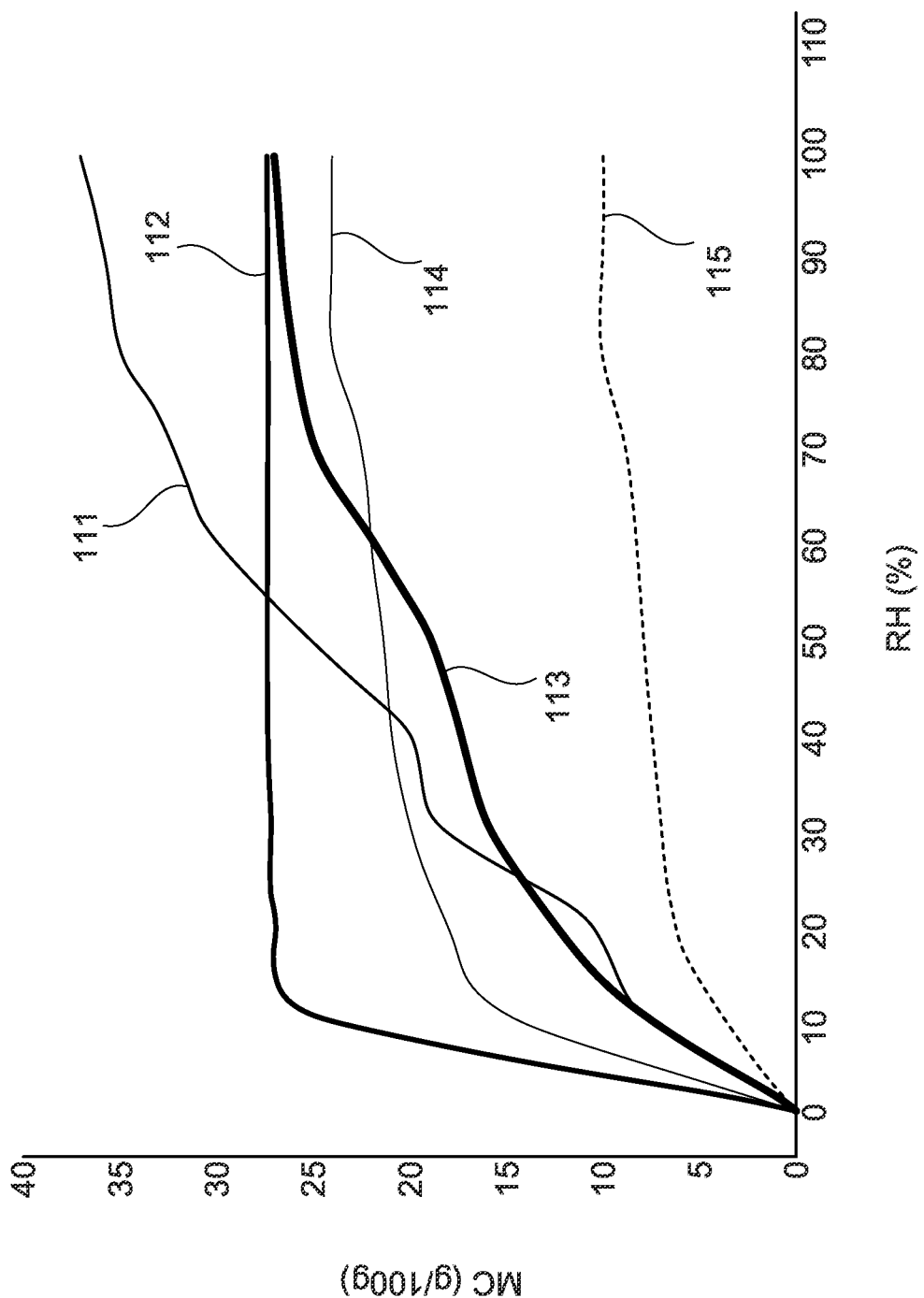
FIG. 3 shows schematically and exemplarily a diagram of a water absorption capability of various desiccants.

The humidity absorbent material may include a silica gel. The silica gel includes an amorphous and porous form of silicon dioxide with a large internal surface. Hence, the internal surface may receive water vapor from the environment. FIG. 3 shows moisture adsorption capacities of several desiccants such as silica gel, calcium oxide (CaO), clay, molecular sieve or calcium sulfate ($CaSO_4$). In FIG. 3, the x-axis shows a relative humidity range RH (%) and the y-axis shows a moisture capacity of each desiccant MC (g moisture/100 g desiccant). Further, in FIG. 3, the curve 111 refers to the moisture capacity of silica gel, the curve 112 refers to the moisture capacity of calcium oxide (CaO), the curve 113 refers to the moisture capacity of clay, the curve 114 refers to the moisture capacity of molecular sieve and the curve 115 refers to the moisture capacity of calcium sulfate ($CaSO_4$).

As shown in FIG. 3, the silica gel has the highest moisture adsorption capacity. Accordingly, even a small amount of the silica gel may absorb large amount of water vapor. Hence, by applying the silica gel in the cooling element 30, a weight of the temperature management system 1, thus the energy storage system may be reduced, even though an efficient heat dissipation from the energy storage module 10 can be achieved.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A temperature management system for an energy storage system, comprising:
   at least one energy storage module,
   a carrier element, and
   a cooling element,
   the cooling element comprising a first surface contacting ambient air surrounding the energy storage system and a second surface opposite to the first surface,
   the carrier element being arranged between the second surface of the cooling element and the energy storage module and configured to transfer heat from the energy storage module in a direction to the ambient air, the carrier element and the cooling element being arranged layer-by-layer structure, and
   the cooling element comprising at least one humidity absorbent material to increase a heat capacity of the cooling element, the humidity absorbent material contacting the ambient air surrounding the energy storage system, and the cooling element being a passive cooling element.

2. The temperature management system according to claim 1, the humidity absorbent material being configured to absorb water vapor from the ambient air.

3. The temperature management system according to claim 1, the carrier element comprising a metal material.

4. The temperature management system according to claim 3, the metal material of the carrier element comprising aluminum or steel.

5. The temperature management system according to claim 1, further comprising a thermal interface arranged between the energy storage module and the carrier element.

6. The temperature management system according to claim 1, the humidity absorbent material comprising a hygroscopic material.

7. The temperature management system according to claim 6, the humidity absorbent material comprising a silica gel.

8. The temperature management system according to claim 1, the carrier element and the cooling element being arranged in a sandwich structure.

9. A motor vehicle comprising a temperature management system, the temperature management system being configured to control a temperature of an energy storage system of the motor vehicle, the temperature management system comprising:
   at least one energy storage module,
   a carrier element, and
   a cooling element,
   the cooling element comprising a first surface contacting ambient air surrounding the energy storage system and a second surface opposite to the first surface,
   the carrier element being arranged between the second surface of the cooling element and the energy storage module and configured to transfer heat from the energy storage module in a direction to the ambient air, the carrier element and the cooling element being arranged layer-by-layer structure, and
   the cooling element comprising at least one humidity absorbent material to increase a heat capacity of the cooling element, the humidity absorbent material contacting the ambient air surrounding the energy storage system, and the cooling element being a passive cooling element.

10. The motor vehicle according to claim 9, the humidity absorbent material being configured to absorb water vapor from the ambient air.

11. The motor vehicle according to claim 9, the carrier element comprising a metal material.

12. The motor vehicle according to claim 11, the metal material of the carrier element comprising aluminum or steel.

13. The motor vehicle according to claim 9, the temperature management system further comprising a thermal interface arranged between the energy storage module and the carrier element.

14. The motor vehicle according to claim 9, the humidity absorbent material comprising a hygroscopic material.

15. The motor vehicle according to claim 14, the humidity absorbent material comprising a silica gel.

16. The motor vehicle according to claim 9, the carrier element and the cooling element being arranged in a sandwich structure.

17. A method for manufacturing a temperature management system for an energy storage system, comprising the following steps:
   providing at least one energy storage module,
   contacting a first surface of a cooling element with ambient air surrounding the energy storage system and providing a second surface opposite to the first surface, and
   arranging a carrier element between the second surface of the cooling element and the energy storage module,
   the carrier element being configured to transfer heat from the energy storage module in a direction to the ambient air, the carrier element and the cooling element being arranged layer-by-layer structure, and
   the cooling element comprising at least one humidity absorbent material to increase a heat capacity of the cooling element, the humidity absorbent material contacting the ambient air surrounding the energy storage system, and the cooling element being a passive cooling element.

* * * * *